June 4, 1968 P. J. SELGIN 3,387,151
ELECTRIC MOTOR
Filed Feb. 16, 1965 2 Sheets-Sheet 1
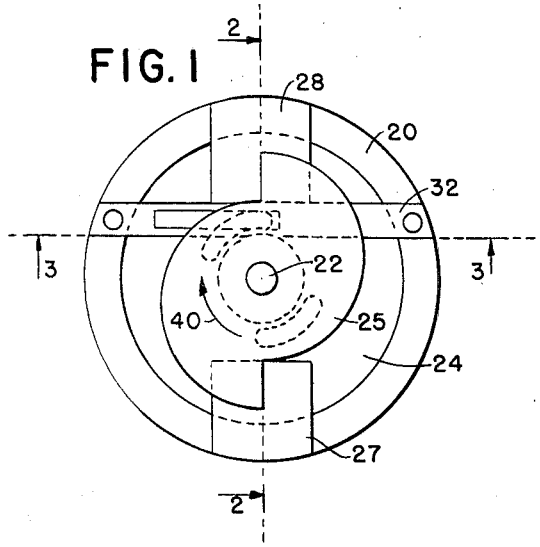
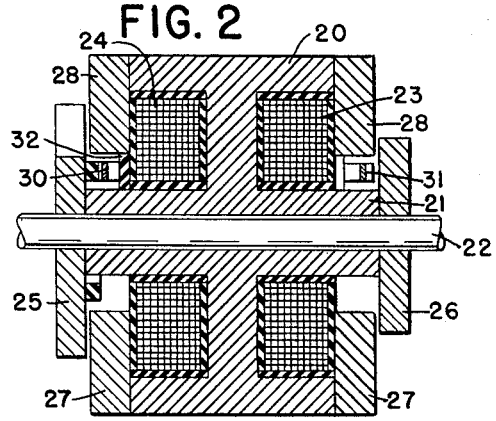
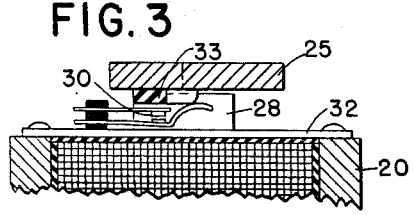
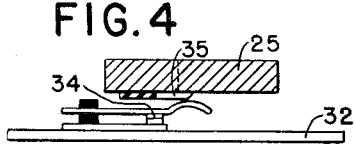
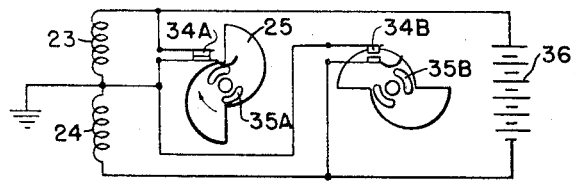
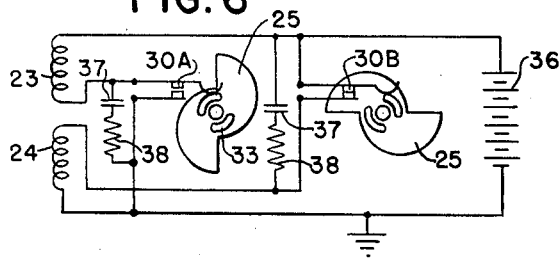
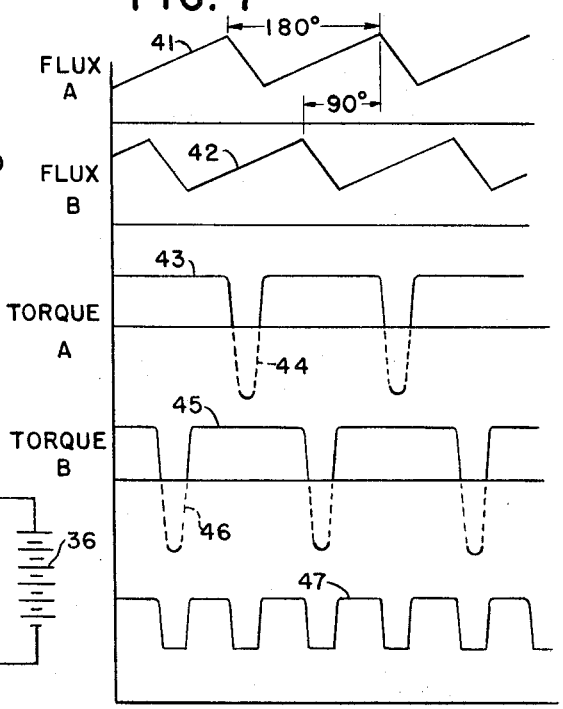
PAUL J. SELGIN
INVENTOR
BY *Ralph E. Bitner*
ATTORNEY June 4, 1968     P. J. SELGIN     3,387,151
ELECTRIC MOTOR
Filed Feb. 16, 1965     2 Sheets-Sheet 2
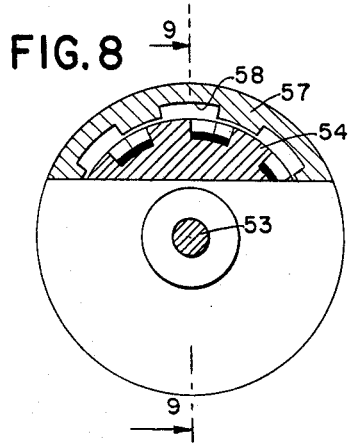
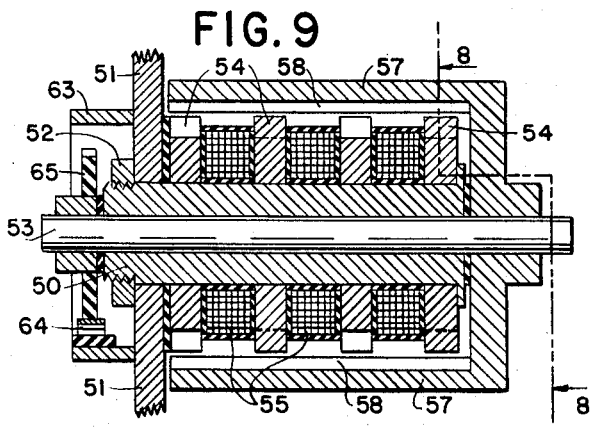
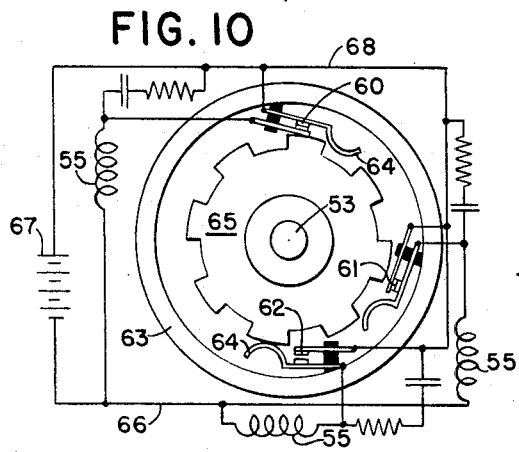
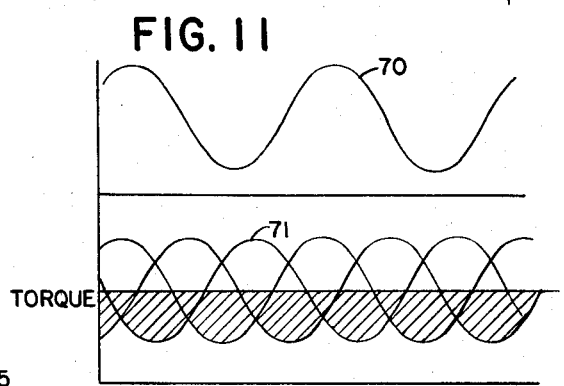
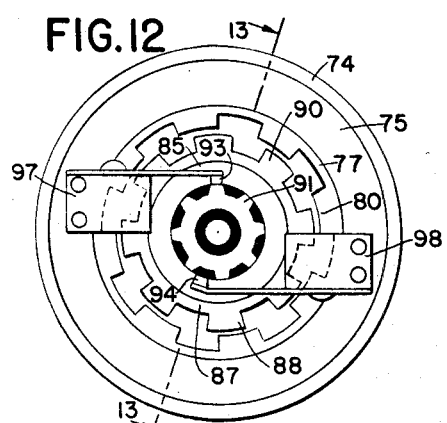
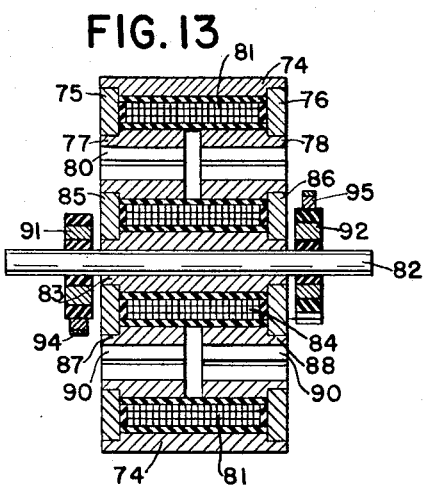
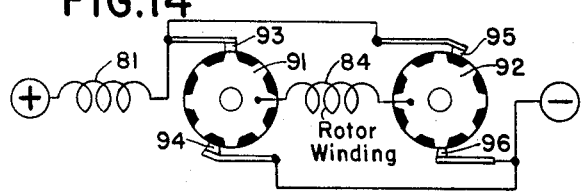
PAUL J. SELGIN
INVENTOR
BY Ralph E. Bitner
ATTORNEY United States Patent Office 3,387,151
Patented June 4, 1968

3,387,151
ELECTRIC MOTOR
Paul J. Selgin, 75 Wooster St., Bethel, Conn. 06801
Filed Feb. 16, 1965, Ser. No. 432,996
4 Claims. (Cl. 310—46)

This invention relates to an electric motor of simplified construction. The invention has particular reference to an electric motor which requires one or more simple toroidal coils and no complicated commutator. The coils may be fabricated prior to assembly and can easily be removed from the motor at any time for repair.

Many types of electric motors have been designed and built. The present conventional direct current motor requires a commutator and a number of armature windings placed in slots in a ferromagnetic cylinder. In addition, most of the electric motors require a field winding or a set of permanent magnets. The present invention has high efficiency and requires only one or more field windings which are placed on a stator. These windings can be pre-wound on insulated cores and completely fabricated before assembly. Instead of a commutator, a plurality of make and break contacts on a single conductor are used to produce a unidirectional torque which turns the rotor.

One of the objects of this invention is to provide an improved electric motor which avoids one or more of the disadvantages and limitations of prior art motors.

Another object of the invention is to provide an electric motor which turns at a relatively low speed, thereby eliminating the need for reducing gear trains in many applications.

Another object of the invention is to reduce the weight of the rotating parts of the motor and thereby reduce the inertia.

Another object of the invention is to permit the use of windings having many turns and thereby increase the impedance of the windings even though the motor is small and has reduced power.

Another object of the invention is to reduce the cost of electric motors by the use of simplified components.

Another object of the invention is to provide an electric motor having high acceleration in relationship to its running speed.

Another object of the invention is to provide a motor wherein the direction of rotation can be reversed or wherein the rotation of the rotor may be suddenly stopped by a magnetic locking action.

The invention comprises a stator having a plurality of toroidal windings axially aligned with a motor shaft. A rotor is secured to the shaft with its periphery moving adjacent to pole pieces of ferromagnetic material secured to a core which is surrounded by the windings. The rotor may also contain a toroidal winding. The windings are connected to a source of direct current in series with one or more pairs of electrical contacts, these contacts being operated by the rotor as it turns on its axis.

For a better understanding of the present invention, together with other and further objects thereof, reference is made to the following description taken in connection with the accompanying drawings.

FIG. 1 is an end view of one form of the electric motor having a double spiral rotor.

FIG. 2 is a cross sectional view of the motor shown in FIG. 1 and is taken along line 2—2 of that figure.

FIG. 3 is a partial cross section of the motor shown in FIG. 1 and is taken along line 3—3 of that figure. This view shows the contacts operated by the rotor.

FIG. 4 is a view, similar to FIG. 3, but includes contacts which are closed by the rotor instead of being opened.

FIG. 5 is a schematic wiring diagram of connections which is used when the rotors short circuit the windings.

FIG. 6 is a schematic wiring diagram, similar to FIG. 5 but showing the connections when the rotors open the circuits to the windings.

FIG. 7 is a graph showing the flux and torque values during the operation of the motor.

FIG. 8 is an end view, partly in section, of an alternate form of electric motor made in accordance with the principles of this invention.

FIG. 9 is a cross sectional view of the motor shown in FIG. 8 and is taken along line 9—9 of that figure.

FIGURE 10 is an end view of the motor showing the three pairs of contacts and the cam wheel which operates them. This view also shows a schematic wiring diagram.

FIG. 11 is a graph showing the flux values generated by one of the windings and the torque produced by all three windings.

FIG. 12 is an end view of an alternate form of motor employing two toroidal windings, one for the rotor and one for the stator.

FIG. 13 is a cross sectional view of the motor shown in FIG. 12 and is taken along line 13—13 of that figure.

FIG. 14 is a schematic wiring diagram of the motor shown in FIGS. 12 and 13.

Referring now to FIGS. 1 through 4, the motor comprises a ferromagnetic stator which includes a cylindrical core 21 having a bore for a shaft 22. The core 20 is formed with reentrant annular spaces for accommodating toroidal windings 23 and 24. At each end of the motor a double spiral shaped rotor on either end of the motor is secured to the shaft 22 and each rotor 25, 26, is positioned so that a small air gap exists between its inner surface and a double pair of pole pieces 27 and 28.

Each winding 23 and 24 is connected in series with a pair of contacts 30 and 31, shown in greater detail in FIGS. 3 and 4, these contacts serving to either short circuit one of the windings or to open the circuit to the windings so that negative torque waves can be eliminated and a unidirectional rotary force be generated. The contacts are secured to an insulator strip 32 which in turn is secured to a portion of the core 20.

The motor described above may be operated by sequentially short-circuiting each of the windings, or by sequentially disconnecting the windings from a source of electrical power. In FIG. 3, normally closed contacts 30 are arranged so that they will be opened only when an insulator portion 33 is rotated past the contact position. In FIG. 4, normally open contacts 34 are closed by the insulator cam 35 on pole piece 25. The connections for each of these wiring systems are shown in FIGS. 5 and 6. FIG. 5 shows the diagram of connections when the contacts 34 are closed by cam 35. It should be noted that contacts 34 short circuit only one of the windings 23 while the other winding 24 receives current from a source of potential 36 through contacts 34. As the rotor revolves, insulator cams 35A move away from the contact portions 34 and the similar insulator cams 35B actuate contacts 34B on the other side of the motor and winding 24 is short-circuited. It is evident from this figure that both windings are not short-circuited at the same time and when either one of the windings is short-circuited, the other winding receives more current than if the two windings were connected in series. FIG. 5 also shows the relative positions of the two rotors 25, these being spaced at angle of 90 degrees from each other.

The wiring diagram shown in FIG. 6 illustrates the alternate method of connecting the contacts and the two windings. Normally closed contacts 30A are shown open, actuated by one of the insulator cams 33. Contacts 30 are connected in series between winding 23 and battery 36. In order to absorb the spark, a capacitor 37, in series with a resistor 38, is connected across the contacts. Winding 24 is also connected in series with the other pair of contacts 30B and a similar capacitor 37 and resistor 38 are connected across these contacts. The operation of both types of wiring is the same. When the rotor 25 moves to a position as shown in FIG. 1, the winding 24, adjacent to that pole piece, has its current cut off either by shoft-circuiting contacts connected across the winding or by opening contacts connected in series with the winding. After the rotor 25 has moved about 40 degrees in the direction as indicated by arrow 40, the current through the winding is again turned on and the rotor 25 is attracted by pole piece 27 to produce a useful torque.

The wave forms shown in FIG. 7 illustrate the amount of flux generated by the two windings and the torque which exists between the pole pieces and the rotors. Curve 41 represents the flux in winding 24 and curve 42 shows the magnitude of the flux produced by winding 23. In this graph, the peak values of the flux are separated from each other by one-half revolution or 180 degrees. The separation between the peak values of curve 41 and cure 42 is 90 degrees, the same as the angular separation of the two rotors 25. The torque produced by the flux 41 is shown as curve 43. This curve having positive torque values which tend to move the rotor in the desired direction. If the current were not broken through the winding, a high negative torque 44 would be generated. This negative pulse is shown in dotted lines in FIG. 7 and does not affect the operation because the elimination of the flux eliminates the torque. The torque values produced by winding 23 are shown as curve 45 with negative pulses 46. The combination of curves 43 and 45, with the negative portions eliminated, produces a combination torque 47, which, while variable, is always positive.

Referring now to FIGS. 8, 9, and 10, an alternate form of the invention is shown. This motor includes a cylindrical core 50 bolted to a non-magnetic support 51 by a nut 52. The core 50 contains an axial bore for a rotatable shaft 53. The core supports four ferromagnetic disks 54, having teeth formed on their peripheries, and three electric windings 55. These disks and windings are firmly clamped together by nut 52 and form the stator portion of the motor. The rotor portion of the motor comprises an end disk 56 secured to a hollow cylindrical ferromagnetic sheel 57. The inside surface of the shell is formed with longitudinal grooves 58 for magnetic action with theh teeth on disks 54. End disk 56 is secured to shaft 53 and revolves with it.

In order to control the current through the three windings, three pairs of contacts 60, 61, and 62 (FIG. 10) are mounted on a support ring 63. Each pair of contacts includes an extended portion 64 which makes mechanical contact with the teeth of a control wheel 65 and thereby opens and closes the electrical contacts in sequential order. In FIG. 10, contacts 62 are shown open, contacts 61 have just been closed, and contacts 60 are about to be opened. Control wheel 65 is secured to shaft 53. FIG. 10 also shows a schematic wiring diagram of the motor, indicating how the windings 55 are each connected in series with on of the contact pairs. A common conductor 66 connects one terminal of a battery 67 with all three windings. The other ends of the windings are connected to their contact pairs and a second common conductor 68 connects the other terminal of the battery to one side of all three contacts. The usual capacitor-resistor combination may be bridged across each pair of contacts but this is not always necessary.

The operation of this form of motor will be evident from a consideration of the curves shown in FIG. 11. The curve 70 shows the approximate variations in flux between the teeth on one of the disks 54 and the matching grooves 58 on the inside of the motor cylinder 57. The shape of the teeth and grooves may be varied considerably and this variation can change the form of curve 70. This curve shows the flux which would exist if the current through the winding were not broken. The torque curves 71 represent the torque exerted by all the windings if the current is not turned off. It is obvious from this diagram that the total torque is zero if the current is on all the time. Contacts 60, 61, and 62 are arranged to open the circuit and cut off the current in each winding so that the shaded portions of the torque curves are eliminated.

FIGURES 12, 13, and 14 show still another arrangement of coils and pole pieces to form a motor. This type uses two toroidal coils instead of one and each coil is connected to rotating means for making and breaking the current flow through the coil as the rotor turns. This alternate device is similar to the motor shown in FIGURES 1 through 7 except that the second coil provides a repelling force between the rotor and stator pole pieces and thereby provides a more even rotary torque.

The structure of this alternate type of machine is shown in FIGURES 12, 13, and 14. The stator includes an outer cylindrical support 74, two flanges 75 and 76, and two inner cylinders 77 and 78, each provided with opposing pole pieces 80. The outer and inner cylinders together with the two flanges are all made of ferromagnetic material and they are combined as shown in FIG. 13 to provide an annular space which is filled with a first toroidal magnetic winding 81. When completely assembled there is only one air gap between the ends of the pole pieces.

The rotor is secured to a shaft 82 which is usually journalled in a suitable bearing (not shown). Surrounding the shaft is a cylinder of ferromagnetic material 83 which supports a second toroidal winding 84, held in place by two other flanges 85 and 86. The outside surface of the winding is partly covered by two cylindrical supports 87 and 88, each provided with a series of pole pieces 90. An air gap, matching the air gap between pole pieces 77 and 78, is positioned between the pole pieces 87 and 88.

In order to make and break the current through each coil, two toothed wheels 91 and 92 are mounted on the shaft, generally on opposite sides of the rotor. They are insulated from the shaft but each is connected respectively to one of the ends of the rotor winding 84 (see FIG. 14). Two brushes 93 and 94 are mounted adjoining wheel 91 to make a connection with the wheel and one side of the rotor winding. Two similar brushes 95 and 96 are mounted adjoining wheel 92 for the same purpose but to make and break connection to the other terminal of winding 84. The brush may be supported by any suitable means, such as support blocks 97 and 98 (FIG. 12). As shown in FIG. 14, the brushes on each wheel never make contact with the conducting parts of the wheel at the same time but alternate in sending current from an electrical source of power to the wheel and the rotor winding.

The operation of this form of the motor is as follows: let it be assumed that the brushes 93, 94, 95, and 96 are in the position as shown in FIG. 14. Then, when power is applied to the terminals, current will flow through stator winding 81, brush 93, wheel 91, rotor winding 84 (from left to right), wheel 92, brush 96, and the other terminal. These currents produce a definite magnetic polarity at pole pieces 80 on the stator and adjacent pole pieces 90 on the rotor. A mechanical force is produced which either attracts or repels the poles, depending upon the direction of the current through the windings and the starting position. The rotor moves one-half the distance between teeth and then the current in the rotor winding is reversed. At this position current flows from the stator winding 81, through brush 95, wheel 92, rotor winding 84 (from right to left), wheel 91, brush 94, and the negative terminal.

If the rotor and stator poles were attracting each other, they will now repel and, because the pole pieces were moved one-half a pole distance, the rotor will continue to revolve in the same direction. The ultimate speed of the rotor depends upon the inductance of the windings and the generation of the "back electromotive force" caused by the variation of rotor magnetic flux applied to the stator winding.

Since the rotor and stator poles alternately attract and repel each other as the rotor revolves, there are no dead spots where no force exists and the rotary force is constant.

In FIGURES 8 through 14, the pole pieces have been shown in a size which is larger than is contemplated for a slow speed motor. There may be three or four times as many pole pieces as shown, depending upon the speed desired.

From the above description it is obvious that an efficient and low cost motor has been developed. The windings are toroidal and are fabricated before assembly. The windings can be removed from the motor at any time for test and repair.

The foregoing disclosure and drawings are merely illustrative of the priciples of this invention and are not to be interpreted in a limiting sense. The only limitations are to be determined from the scope of the appended claims.

I claim:

1. An electric motor comprising; a rotor secured to an axial shaft; a plurality of rotor pole pieces of ferromagnetic material symmetrically spaced about the shaft and secured thereto, said rotor pole pieces arranged in pairs adjoining an annular air gap; a rotor toroidal winding for producing magnetic flux in said pole pieces, said rotor winding mounted in axial alignment with the shaft and supported by a shield of ferromagnetic material; a plurality of stator pole pieces arranged in pairs adjoining an annular gap; a stator toroidal winding for producing magnetic flux in the stator pole pieces, said stator winding mounted in axial alignment with the shaft and supported by a shield of ferromagnetic material, two toothed wheels secured to said shaft; a pair of brushes mounted for making electrical contact with the teeth of each wheel and; circuit means which connects one of said windings in series with the other winding, said brushes, and a pair of terminals which are for connection to a source of electrical power; said brushes and toothed wheels arranged for alternately reversing the current in one of said windings in synchronism with the passage of the rotor pole pieces by the stator pole pieces.

2. An electric motor as claimed in claim 1 wherein the rotor winding has one end connected to one toothed wheel and the other end connected to the other toothed wheel.

3. An electric motor as claimed in claim 2 wherein all of said pole pieces are symmetrically spaced in cylindrical spaces around the shaft and wherein the number of rotor pole pieces is the same as the number of stator pole pieces.

4. An electrical motor as claimed in claim 2 wherein the spaces between the teeth of the toothed wheels is filled by an insulating material.

References Cited

UNITED STATES PATENTS

| | | | |
|---|---|---|---|
| 2,173,282 | 10/1939 | List | 310—46 |
| 2,812,454 | 11/1957 | Buck | 310—46 |
| 3,077,555 | 2/1963 | Fredrickson | 310—49 |

MILTON O. HIRSHFIELD, *Primary Examiner.*

G. NUNEZ, *Assistant Examiner.*